United States Patent Office 3,816,559
Patented June 11, 1974

3,816,559
SOLID, CURABLE COMPOSITIONS CONTAINING OXOALKYL ACRYLAMIDES
Eugene Richard Farone, Mentor-on-the-Lake, Ohio, assignor to The Lubrizol Corporation, Wickliffe, Ohio
No Drawing. Continuation of abandoned application Ser. No. 56,698, July 20, 1970. This application Mar. 2, 1972, Ser. No. 231,401
Int. Cl. C08g 41/04
U.S. Cl. 260—857    8 Claims

ABSTRACT OF THE DISCLOSURE

Solid, curable solutions or dipsersions are formed by blending a polymer substantially free of ethylenic unsaturation, usually a thermoplastic polymer, with an oxoalkyl-substituted acrylamide such as diacetone acrylamide, heating to above the melting point of the latter, and then cooling. They may be cured (e.g., by the action of a free radical catalyst) under relatively unsophisticated conditions, such as in the home, to form useful and decorative coatings, laminates and adhesives.

---

This is a continuation of application Ser. No. 56,698, filed July 20, 1970, now abandoned.

This invention relates to new compositions of matter capable of being cured into useful resinous products. More particularly, it relates to compositions which are solid at room temperature, said compositions comprising (A) a polymer substantially free of ethylenic unsaturation and (B) a compound of the formula

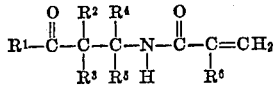

wherein each of $R^1$, $R^2$ and $R^3$ is hydrogen, a hydrocarbon radical, or a hydroxyalkyl or alkoxyalkyl radical, each of $R^4$ and $R^5$ is hydrogen or a hydrocarbon radical, and $R^6$ is hydrogen, halogen or a lower alkyl radical; said compositions being capable of forming, at elevated temperatures, a solution or dispersion.

The present invention finds application in the preparation of laminates, coatings, adhesive films and the like under relatively unsophisticated conditions such as those found in the home. Solutions and dispersions of resins in volatile solvents are, of course, well known in the art. However, such solutions and dispersions are unsuitable for use for many purposes in the home because of the difficulties and dangers involved in removing the solvent. It is of advantage, therefore, to prepare polymeric compositions which are entirely or substantially non-volatile and which can be converted to resinous products using ordinary home appliances.

A principal object of the invention, therefore, is to provide new polymeric compositions which are entirely or substantially non-volatile at room temperature.

A further object is to provide compositions which are partly polymeric and partly monomeric in nature, and which can be cured under relativley simple conditions to form laminates, coatings and the like.

Still another object is to provide useful resinous compositions.

Other objects will in part be obvious and will in part appear hereinafter.

Component A in the compositions of this invention is a polymer substantially free of ethylenic unsaturation. This polymer may be thermoplastic, and thermoplastic ones are preferred; or it may be thermosetting or thermoset, the word "thermosetting" denoting a polymer which is capable of crosslinking or curing to form an infusible product, and the word "thermoset" denoting a polymer which has already been so crosslinked or cured.

The polymers should be substantially free of ethylenic unsaturation so as to avoid a substantial amount of crosslinking with component B. In general, component A should contain not more than about one ethylenic unit for each 20 polymeric units in the chain.

The following are illustrative of resins which may be used as component A.

I. Thermoplastic resins: Polymers of vinyl halides such as vinyl chloride and vinyl bromide; of polymerizable esters such as vinyl acetate, vinyl propionate, methyl acrylate, methyl methacrylate, ethyl acrylate, n-butyl acrylate, trimethylolpropane trimethacrylate and the like; of unsaturated hydrocarbons such as ethylene (especially low-density polyethylene), propylene, the butenes, styrene and the like; copolymers and interpolymers of vinyl halides with polymerizable esters, especially vinyl acetate; saturated polyamides and polyesters.

II. Thermosetting resins: Uncured epoxy resins, lightly crosslinked polymers of alkyl acrylates, A-stage phenolic resins.

III. Thermoset resins: B-stage phenolic resins, cured epoxy resins.

Component B in the compositions of this invention is, as previously indicated, a compound of the formula

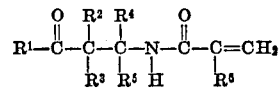

wherein each of $R^{1-6}$ is as defined. As used in the formula and elsewhere herein, the term "hydrocarbon radical" includes aliphatic, cycloaliphatic and aromatic (including aliphatic-substituted aromatic and aromatic-substituted aliphatic) radicals. Substituted hydrocarbon, alkyl, aryl, etc., radicals are considered to be fully equivalent to the hydrocarbon, alkyl, aryl, etc., radicals and to be part of this invention. By "substituted" is particularly meant radicals containing relatively inert substituents such as ether (especially lower alkoxy), ester (especially lower carbalkoxy), keto, nitro, halogen and the like so long as these substituents do not alter significantly the character or reactivity of the radical. In general, no more than about three such substituent groups will be present for each 10 carbon atoms in the radical.

The following are illustrative of hydrocarbon and substituted hydrocarbon radicals within the scope of this invention.

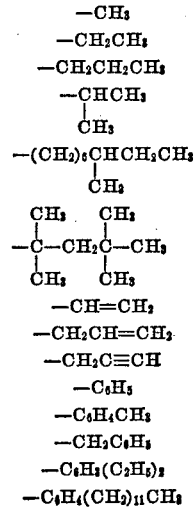

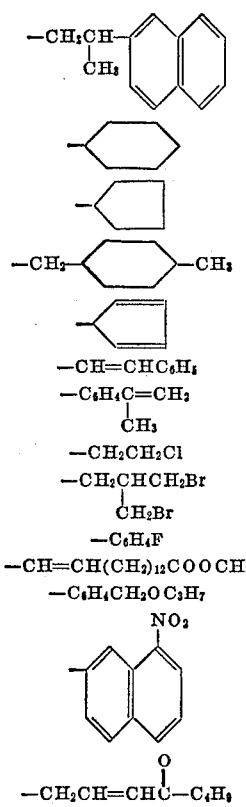

Preferably, the hydrocarbon or substituted hydrocarbon radicals in the compounds used in the composition of this invention are lower hydrocarbon radicals, the word "lower" denoting radicals containing no more than about 12 carbon atoms. Still more preferably, they are lower alkyl or aryl radicals, most often alkyl. In the most preferred compounds, $R^1$ is lower alkyl (usually) or a radical of the formula $R^7O-R^8-CH_2-$, wherein $R^7$ is hydrogen or lower alkyl and $R^8$ is a divalent hydrocarbon atom having less than five carbon atoms, usually methylene; each of $R^2$ and $R^3$ is hydrogen (usually) or $R^7O-R^8-$; $R^4$ and $R^5$ are lower alkyl; and $R^6$ is hydrogen or methyl. Especially useful are compounds in which $R^1$, $R^4$ and $R^5$ are lower alkyl and $R^2$, $R^3$ and $R^6$ are hydrogen.

The following are illustrative of the compounds which may be used as component B in the compositions of this invention.

N-(1,1-dimethyl-3-oxobutyl)acrylamide (diacetone acrylamide)

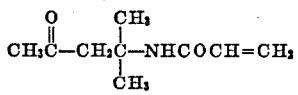

N-(1,3-diphenyl-1-methyl-3-oxopropyl)methacrylamide

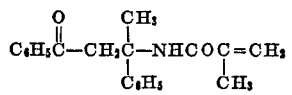

N-(1,1-dimethyl-3-oxobutyl)-2-chloroacrylamide

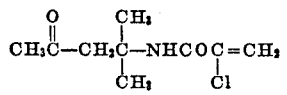

N-(1,1-diethyl-5-hydroxy-3-oxopentyl)methacrylamide

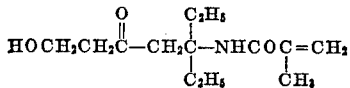

N-[1,1-dimethyl-2,2-bis(hydroxymethyl)-5-hydroxy-3-oxopentyl]-acrylamide

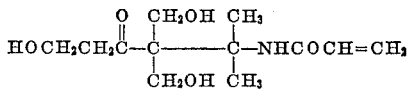

N-[1,1-dimethyl-2,2-bis(n-butoxymethyl)-5-n-butoxy-3-oxopentyl]acrylamide

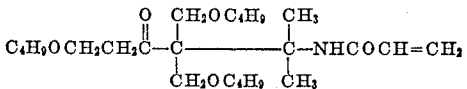

The preparation of compounds of this type wherein $R^{1-3}$ are hydrogen or hydrocarbon radicals and $R^6$ is hydrogen or lower alkyl is described in U.S. Pats. 3,277,056 and 3,425,942, the disclosures of which are incorporated by reference herein. Similar compounds wherein one or more of $R^{1-3}$ are hydroxyalkyl or alkoxyalkyl radicals are disclosed in copending applications Ser. No. 833,162, filed June 13, 1969, and Ser. No. 111,676, filed Feb. 1, 1971. Compounds in which $R^6$ is a halogen atom, while they may be used in the compositions of this invention, are not themselves part of the invention. They are disclosed and claimed in copending application Ser. No. 97,055, filed Dec. 10, 1970, now U.S. Pat. 3,666,306.

The compounds most particularly useful as component B are diacetone acrylamide and diacetone methacrylamide, especially the former. For the sake of convenience and brevity herein, frequent reference will be made hereinafter to diacetone acrylamide as representative of the genus; however, it is to be understood that other compounds of the genus may be substituted for diacetone acrylamide.

The proportions of the ingredients in the compositions of this invention are generally within the range of 2–70 parts (by weight) of component A and 98–30 parts of component B, respectively. Most often, component A is the solute or discontinuous phase and is therefore present in minor amounts as compared with component B; that is, less than 50 parts of component A per 100 parts of the combination of components A and B. The compositions may also contain minor amounts (e.g., up to about 2.5 parts each per 100 parts of the combination of components A and B) of other ingredients, especially antioxidants such as hindered phenols and polymerization catalysts, usually free radical catalysts such as benzoyl peroxide, t-butyl hydroperoxide, acetyl peroxide, azobisisobutyronitrile and the like.

Volatile solvents may also be present in small amounts to aid in maintaining proper viscosity, solubility or dispersibility of components A. Typical voltaile solvents which may be used include aromatic hydrocarbons such as benzene, toluene and xylene; chlorinated aliphatic hydrocarbons such as 1,2-dichloroethane, 1,1,1-trichloroethane and the like; alcohols such as methanol, ethanol, 1-propanol, 2-propanol or one of the butanols; lower alkyl mono- and di- ethers of glycols such as ethylene glycol or diethylene glycol; ketones such as acetone, methyl ethyl ketone or methyl isobutyl ketone; and relatively low molecular weight esters such as ethyl acetate, butyl acetate, ethyl propionate and the like.

The compositions of this invention are prepared by merely blending the components and heating to above the melting point of diacetone acrylamide, thereby liquefying the latter and causing the formation of a solution or dispersion of the polymer therein. Generally, temperatures of about 60–100° C. are adequate. Especially if the composition also contains a polymerization catalyst, as is usually the case, temperatures much above 100° C. should be avoided since component B will polymerize if the temperature is too high. Upon cooling, the compositions resolidify.

When liquid, the compositions of this invention may be solutions or dispersions depending upon the solubility of component A in component B. In general, this solubility increases with increasing polarity of the polymer used as component A. Thus, polar polymers such as polyacrylates, polyvinyl acetate, polyvinylbutyral and the like form solutions, while less polar polymers such as polyvinyl chloride, polyethylene and polypropylene form dispersions. Both types of compositions are included in the present invention. It is also within the scope of this invention to use a mixture of polymers as component A, or to add to the composition curable polymers such as unsaturated polyesters, or crosslinking agents such as styrene, diallyl phthalate or the like.

The following examples are illustrative of the compositions of this invention. All parts are by weight.

EXAMPLE 1

| | Parts |
|---|---|
| Polyamide resin ("Versamid 950") | 20 |
| Trimethylolpropane trimethacrylate | 10 |
| Diacetone acrylamide | 200 |
| 2,6-Di-t-butyl-p-cresol | 0.2 |

The above components are blended and the blend is heated to 65–70° C., whereupon a dispersion forms.

EXAMPLE 2

| | Parts |
|---|---|
| Copolymer of lower alkyl acrylates and methacrylates ("Acryloid B-82") | 20 |
| Trimethylolpropane trimethacrylate | 10 |
| Diacetone acrylamide | 200 |
| 2,5-Dimethylhexane-2,5-diperoctoate | 2 |
| 2,6-Di-t-butyl-p cresol | 0.2 |

Upon blending these components and heating to 70–75° C., the mixture fuses and forms a solution.

EXAMPLE 3

| | Parts |
|---|---|
| Copolymer of lower alkyl methacrylates, mostly methyl methacrylate ("Acryloid B-66") | 20 |
| Trimethylolpropane trimethacrylate | 10 |
| Diacetone acrylamide | 200 |
| 2,5-Dimethylhexane-2,5-diperoctoate | 2 |
| 2,6-Di-t-butyl-p-cresol | 0.2 |

Upon blending and heating to 70–75° C., a solution forms as in Example 2.

EXAMPLE 4

| | Parts |
|---|---|
| Trimethylolpropane trimethacrylate | 10 |
| Diacetone acrylamide | 200 |
| 2,5-Dimethylhexane-2,5-diperoctoate | 2 |
| 2,6-Di-t-butyl-p-cresol | 0.2 |

The mixture is heated to 70° C., whereupon a solution forms.

EXAMPLE 5

| | Parts |
|---|---|
| Trimethylolpropane trimethacrylate | 10 |
| Methylolated monomer obtained by reacting one mole of diacetone acrylamide with one mole of formaldehyde, under alkaline conditions | 200 |
| 2,5-Dimethylhexane-2,5-diperoctoate | 2 |
| 2,6-Di-t-butyl-p-cresol | 0.2 |

Upon heating, a solution similar to that of Example 4 forms.

EXAMPLE 6

| | Parts |
|---|---|
| Terpolymer containing about 91% vinyl chloride units, about 3% vinyl acetate units, and about 6% vinyl alcohol units | 10 |
| Diacetone acrylamide | 50 |

The mixture is heated at about 70° C., with stirring, for about 2 hours. A solution forms.

EXAMPLE 7

| | Parts |
|---|---|
| Terpolymer containing about 86% vinyl chloride units, about 13% vinyl acetate units, and about 1% maleic anhydride units | 10 |
| Diacetone acrylamide | 50 |

Upon heating as in Example 6, a solution forms.

EXAMPLE 8

| | Parts |
|---|---|
| Polyvinyl chloride powder ("Geon 101") | 20 |
| Diacetone acrylamide | 50 |

Upon heating to about 70° C., a dispersion forms.

EXAMPLE 9

| | Parts |
|---|---|
| Polyvinyl chloride powder of Example 8 | 20 |
| Methylolated monomer of Example 5 | 50 |

A dispersion similar to that of Example 8 forms.

EXAMPLE 10

| | Parts |
|---|---|
| Polyvinyl chloride powder of Example 8 | 30 |
| Diacetone acrylamide | 50 |

Upon heating to 70° C., a dispersion similar to that of Example 8 forms.

EXAMPLE 11

| | Parts |
|---|---|
| Polyvinyl chloride powder of Example 8 | 60 |
| Trimethylolpropane trimethacrylate | 10 |
| Diacetone acrylamide | 100 |
| t-Butyl perbenzoate | 2 |
| 2,6-Di-t-butyl-p-cresol | 0.1 |

Upon heating to 70° C. a viscous dispersion forms.

EXAMPLE 12

| | Parts |
|---|---|
| Low-density polyethylene | 33 |
| Diacetone acrylamide | 100 |
| t-Butyl perbenzoate | 1 |

Upon heating to about 70° C., a fluid dispersion forms.

EXAMPLE 13

| | Parts |
|---|---|
| Polyvinyl butyral | 100 |
| Diacetone acrylamide | 300 |
| 2,6-Di-t-butyl-p-cresol | 0.1 |

Upon heating to 80–85° C., a viscous dispersion forms.

EXAMPLE 14

| | Parts |
|---|---|
| Polyvinyl butyral | 100 |
| Methylolated monomer of Example 5 | 300 |
| 2,6-Di-t-butyl-p-cresol | 0.1 |

Upon heating to 80–85° C., a dispersion similar to that of Example 13 forms.

EXAMPLE 15

| | Parts |
|---|---|
| Polyvinyl acetate | 300 |
| Diacetone acrylamide | 300 |
| 2,6-Di-t-butyl-p-cresol | 0.1 |

Upon heating to 80–85° C. with stirring, a viscous dispersion forms.

The compositions of this invention may be liquefied and component B therein polymerized under relatively simple conditions to form useful coatings, films, adhesives and the like. Compositions that already contain a free radical catalyst (cf. Examples 2–5, 11, 12, 14 and 15) may be polymerized merely by heating. Compositions not containing such a catalyst (cf. Examples 1, 6–10 and 13) may be polymerized by adding a suitable polymerization catalyst, which is normally one of the free radical type but may also be, for example, an anionic or cationic catalyst, or by irradiating with a high-energy source such as an electron beam or a beam of radioactively produced particles (e.g., from radioactive cobalt) into the polymer. This latter method is described in detail as to its general applicability in U.S. Pat. 3,247,012, the disclosure of which is incorporated by reference herein.

The chemical nature of the resinous compositions of this invention is not known with certainty, and is not considered critcal. It is believed that the compositions prior to curing consist mainly of simple mixtures of component A and component B, said mixtures being capable of forming solutions or dispersions when fused. Component B is believed to be primarily involved in the polymerization.

Because of the simplicity of polymerization methods involving them, the compositions of this invention which already contain polymerization catalysts are particularly suitable for use in the home. For example, the solid composition of Example 4 may be applied to an inexpensive substrate such as plywood, chipboard and the like and covered with a piece of release paper. Upon the application of heat—for example, with an ordinary household iron—polymerization takes place and a decorative coating is applied on the surface. Similarly, the compositions can be used as adhesives for fastening thin, flexible films to surfaces of this type.

In some instances when a plurality of resinous materials is used in a composition of this invention, a coating may be formed which is rich in one resin on the surface and rich in the other in the interior. For example, a composition of this invention may be prepared from diacetone acrylamide, an unsaturated polyester and an acrylic resin. During the curing reaction after a film has been formed, the diacetone acrylamide crosslinks the polyester which "strikes in" to the surface of the object being coated, while the surface film remains rich in the acrylic resin which is more resistant to weathering and therefore particularly suitable for outdoor use.

What is claimed is:

1. A composition which is solid at room temperature, said composition comprising (A) a polymer containing not more than about one ethylenic unit for each 20 polymeric units and (B) a compound of the formula

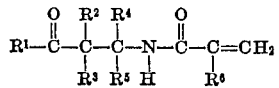

wherein each of $R^1$, $R^2$ and $R^3$ is hydrogen, a lower alkyl radical, or a hydroxyalkyl or alkoxyalkyl radical, each of $R^4$ and $R^5$ is hydrogen or a lower alkyl radical, and $R^6$ is hydrogen, halogen or a lower alkyl radical; said composition forming, upon liquefaction, a solution or dispersion of component A in component B.

2. A composition according to claim 1 wherein component B is diacetone acrylamide.

3. A composition according to claim 2 wherein component A is a thermoplastic polymer.

4. A composition according to claim 3 which consists essentially of about 2–70 parts by weight of component A, about 98–30 parts (respectively) of diacetone acrylamide, and about 0–2.5 parts each of an antioxidant and a polymerization catalyst.

5. A resinous composition formed by polymerizing the composition of claim 4.

6. A resinous composition according to claim 8 wherein component B is diacetone acrylamide.

7. A resinous composition according to claim 6 wherein component A is a thermoplastic polymer.

8. A resinous composition formed by subjecting the composition of claim 1 to free radical polymerization conditions, thereby causing polymerization of component B.

References Cited

UNITED STATES PATENTS

| 3,277,056 | 10/1966 | Coleman | 260—63 |
| 3,425,942 | 2/1969 | Coleman | 252—51.5 |
| 3,518,326 | 6/1970 | Forsberg | 260—828 |

OTHER REFERENCES

Higgins et al., A Versatile New Component For Improved Coatings, *Journal of Paint Technology*, Vol. 41, No. 530, pp. 185–196, March 1969.

MURRAY TILLMAN, Primary Examiner

J. ZIEGLER, Assistant Examiner

U.S. Cl. X.R.

204—159.15, 159.16, 159.17; 260—861 N, 836, 837 R, PV, 844, 873, 875, 878 R, 884, 885, 886